United States Patent
Mergler

(10) Patent No.: US 6,942,575 B2
(45) Date of Patent: Sep. 13, 2005

(54) SERVER AND UNITS

(75) Inventor: Iwo-Martin Mergler, Southampton (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 254 days.

(21) Appl. No.: 10/308,655

(22) Filed: Dec. 3, 2002

(65) Prior Publication Data

US 2003/0109311 A1 Jun. 12, 2003

(30) Foreign Application Priority Data

Dec. 8, 2001 (GB) ............................................. 0129437

(51) Int. Cl.$^7$ ......................... G06F 19/00; G06F 17/00; A63F 13/00; A63F 9/24
(52) U.S. Cl. .............................. 463/42; 463/1; 463/40; 463/41; 700/90
(58) Field of Search ...................... 463/7–8, 16, 29–30, 463/32, 35, 38, 42, 1, 9, 43; 700/90–83

(56) References Cited

U.S. PATENT DOCUMENTS

| | | | | |
|---|---|---|---|---|
| 5,964,660 A | * | 10/1999 | James et al. | 463/1 |
| 5,971,855 A | * | 10/1999 | Ng | 463/42 |
| 6,009,458 A | * | 12/1999 | Hawkins et al. | 709/203 |
| 6,119,229 A | * | 9/2000 | Martinez et al. | 713/200 |
| 6,219,045 B1 | * | 4/2001 | Leahy et al. | 345/757 |
| 6,229,533 B1 | * | 5/2001 | Farmer et al. | 345/473 |
| 6,273,820 B1 | * | 8/2001 | Haste, III | 463/40 |
| 6,415,317 B1 | * | 7/2002 | Yelon et al. | 709/205 |
| 6,476,830 B1 | * | 11/2002 | Farmer et al. | 345/769 |
| 6,533,663 B1 | * | 3/2003 | Iwao et al. | 463/32 |
| 6,745,236 B1 | * | 6/2004 | Hawkins et al. | 709/218 |
| 6,758,746 B1 | * | 7/2004 | Hunter et al. | 463/9 |
| 2002/0022522 A1 | * | 2/2002 | Yamada | 463/42 |
| 2002/0082065 A1 | * | 6/2002 | Fogel et al. | 463/8 |
| 2003/0014423 A1 | * | 1/2003 | Chuah et al. | 707/102 |
| 2004/0038739 A1 | * | 2/2004 | Wanat | 463/36 |

FOREIGN PATENT DOCUMENTS

| | | | | |
|---|---|---|---|---|
| JP | 2000218023 A | * | 8/2000 | A63F/7/20 |
| WO | WO0011625 | | 3/2000 | G07F/17/32 |
| WO | WO0148713 | | 7/2001 | G07F/17/32 |

OTHER PUBLICATIONS

"Ultima Online Renaissance Playguide", 2000, EA Sports, printed from http://www.uo.com/ on Mar. 22, 2005.*
"Diablo II", 2001, Blizzard Entertainment, printed from http://www.battle.net/diablo2exp/basics/on Mar. 22, 2005.*
"Diablo II", 2001, Blizzard Entertainment, printed from http://www.battle.net/diablo2exp/skills/on Mar. 22, 2005.*
"Diablo II", 2001, Blizzard Entertainment, printed from http://www.battle.net/diablo2exp/basics.shtml on Mar. 22, 2005.*
"Diablo II", 2001, Blizzard Entertainment, printed from http://www.battle.net/diablo2exp/items/basics.shtml on Mar. 22, 2005.*
"Diablo II", 2001, Blizzard Entertainment, printed from http://www.battle.net/diablo2exp/monsters/ on Mar. 22, 2005.*
"Diablo II", 2001, Blizzard Entertainment, printed from http://www.battle.net/diablo2exp/monsters/basics.shtml on Mar. 22, 2005.*
"Diablo II", 2001, Blizzard Entertainment, printed from http://www.battle.net/diablo2exp/faq on Mar. 22, 2005.*
Simpson, Z., "The In–game Economics of Ultima Online" Apr. 1999, printed from http://www.mine–control.com/zack/uoecon/uoecon.html.*

* cited by examiner

Primary Examiner—Jessica Harrison
Assistant Examiner—Jason Skaarup
(74) Attorney, Agent, or Firm—Peter Zawilski

(57) ABSTRACT

A method comprises linking a plurality of units with a central server, operating a virtual game on the server, and offering purchasing options to users of the units to purchase virtual non-monetary assets for use in the virtual game. Also described is a system comprising a central server, and a plurality of units linked to the server via a communication link, wherein a unit of the system includes purchasing means operable by a user to purchase virtual non-monetary assets for use by a user in the virtual game.

13 Claims, 1 Drawing Sheet

SERVER AND UNITS

Figure 1:
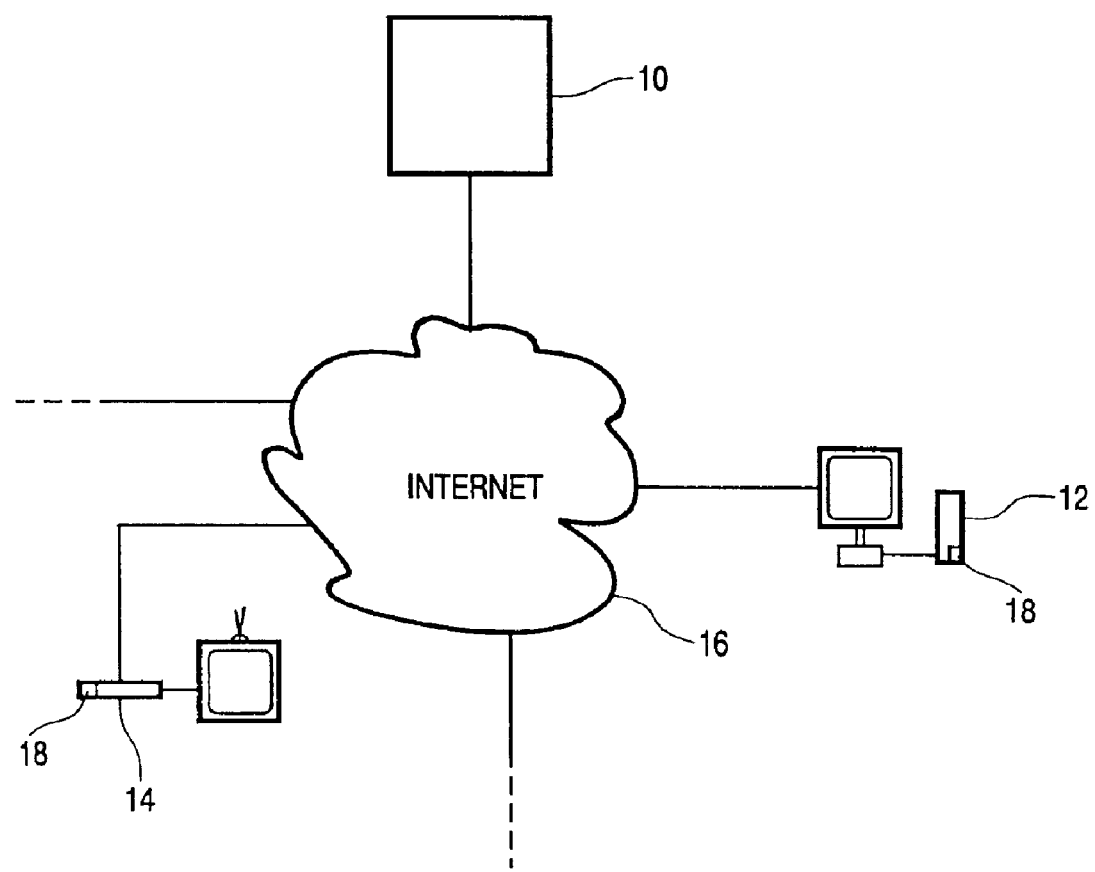

This invention relates to a system and to a method relating to a central server and to a plurality of units linked to said server. In particular it relates to operating a virtual game on the server and to the purchasing of non-monetary assets for use by a user of the virtual game.

WO 00/11625 discloses a method and device for an online games system that aims to enable users to obtain a statement for the amounts paid in by them while the game is ongoing. The method relies on the fact that each game is based on a point system. A sum of money made available by the user on the basis of a price table adapted to the individual games of the games system is converted into the game points, which are credited to a game account of the customer. The game account of the customer is constantly updated in line with the state of play for the entire duration of play, using a calculation module. The method is described as being especially suitable for online multiplayer games systems. The device asks for an upfront payment which is consumed in the course of the game, thereby terminating the game when the user runs out of credit.

WO 01/48713 discloses a system and method for providing an automated gaming service to one or more players that can be implemented in a computer based environment allowing automated computation of wagers, payouts, and other gaming parameters. The automated gaming system can be implemented in an Internet or other network-type environment such that various players can access the automated gaming system from remote locations, thus enabling a virtual gaming environment. Player accounts can be established and players can be granted access to the system and their accounts. The accounts can be set up as debit-type accounts, whereby a player funds or replenishes his or her account in advance of wagering, using a credit card or other payment technique. In this way, real money is converted into virtual money or chips for use in, for example, a virtual casino.

None of the known systems provides for a virtual game that can be arranged so that users can purchase non-monetary assets that can then be used in the virtual game.

It is therefore an object of the invention to improve on the known systems.

According to a first aspect of the invention, there is provided a method comprising linking a plurality of units with a central server, operating a virtual game on said server, and offering purchasing options to users of said units to purchase virtual non-monetary assets for use in said virtual game.

According to a second aspect of the invention, there is provided A system comprising a central server, and a plurality of units linked to said server via a communication link, wherein a unit of said system includes purchasing means operable by a user to purchase virtual non-monetary assets for use by a user in a virtual game running on said server.

Owing to the invention, it is possible to provide a central server and a plurality of units liked to the server so arranged that a user can purchase non-monetary assets for use in the virtual game.

Advantageously, the linking is carried out over a public network, preferably the Internet. The unit may be a digital television receiver or a personal computer. The purchasing means can be a computer program.

Preferably, the virtual game is accessible at no charge to the user, and some of the non-monetary assets will expire after a fixed time. Advantageously, a user may virtually test a non-monetary asset prior to purchase.

Embodiments of the invention will now be described, by way of example only, with reference to the accompanying drawings in which:

FIG. 1 is a schematic view of a system comprising a central server, and a plurality of units linked to the server via a communication link.

The system comprises a central server 10 and a plurality of units (examples of which are shown at 12 and 14), the units being linked to the server 10 via a communication link 16. The link 16 is a public network, for example, the Internet. The unit 12 is a personal computer and the unit 14 is a digital television receiver, in the form of a set top box linked to a conventional analogue television receiver. Other units may be game consoles. The units are shown as having a wired connection to the server via the communication link 16, but equally the link could be wireless, via a cellular network for example.

A virtual game is operated on the server 10, which may be, for example, a multi-user dungeon, as is well known in the art. The game comprises a virtual environment and users who are taking part in the game take on the role of characters in the game world who move around the virtual environment, interacting with other users, within the confines of the game model.

The server based multiplayer game is provided free of charge for the user, and the user is represented in the game by a character. Each character has a number of properties (assets), for example, weapons, health, power, fitness, looks etc. Each user joins the game with a basic set of assets which allow for sensible gameplay. However, most parts of the game will be inaccessible or very difficult to survive with the basic outfit.

Purchasing options are offered to users of the game. A fee (in real money) is charged for the acquisition by the user of new or enhanced assets. These additional (non-monetary) assets give the player a small advantage over other players in the game and allow for the accumulation of a higher score. Some assets will expire after a given time and there will be an additional fee to re-enable or recharge them. Expiry, in some instances, will be usage related.

Each unit of the system is provide with purchasing means 18, operable by a user to purchase virtual non-monetary assets, for use by the user in the virtual game operating on the server 10. The purchasing means 18 can be a suitable user interface, or can comprise a computer program with suitable on screen menu selections. It can be used to store details of the user's financial status, for example, credit card details, and debit the user's account as purchases are made. The purchasing means 18 can be part of the game, for example, a virtual bazaar or trade port or similar, seamlessly integrated into the gameplay.

The game also provides the possibility to test and evaluate new assets before purchase. Prices can also fluctuate according to a simulated stock market with bargains that can be advertised through the game. In this way, users of the game can interact in a full market for the non-monetary assets that are available.

In games of other genres, the non-monetary assets that are available will obviously be different, but the same general principle applies. The user is able to purchase such assets to improve their performance in the game and help to give them a competitive edge against other users.

High scores achieved in the game are worth money. Score can be exchanged into "virtual money" to buy assets. However, by doing so, the score is lowered which affects a user's chance to appear in the game's hall of fame. Score and assets can also be arranged to deteriorate at a low rate when a user is offline. This creates the feeling of "loosing" money and is an additional incentive to continue playing. Players in the hall of fame can be entered into a regular draw for prizes such as real money, game assets or goods. A place in the hall of fame rapidly lowers a user's score and a considerable effort in gameplay is required to maintain it.

What is claimed is:

1. A method comprising linking a plurality of units with a central server, operating a virtual game on said server, and offering purchasing options to users of said units to purchase virtual non-monetary assets for use in said virtual game;

wherein at least some of the purchased non-monetary assets expire after a fixed time; at least some of the purchased non-monetary assets expire due to usage; at least a portion of a user score can be exchanged into virtual money for the purchase of non-monetary assets, thereby lowering the user score; and the user score and purchased non-monetary assets deteriorate at a predetermined rate while the user is offline.

2. A method according to claim 1, wherein said linking is carried out over a public network.

3. A method according to claim 2, wherein said public network is the Internet.

4. A method according to claim 1, wherein said unit is a digital television receiver.

5. A method according to claim 1, wherein said unit is a personal computer.

6. A method according to claim 1, wherein said virtual game is accessible at no charge to the user.

7. A method according to claim 1, wherein a user may virtually test a non-monetary asset prior to purchase.

8. A system comprising a central server, and a plurality of units linked to said server via a communication link, wherein a unit of said system includes purchasing means operable by a user to purchase virtual non-monetary assets for use by a user in a virtual game operating on said server;

wherein the system is operable such that at least some of the purchased non-monetary assets will expire after a fixed time; at least some of the purchased non-monetary assets will expire due to usage; at least a portion of a user score can be exchanged into virtual money for the purchase of non-monetary assets, thereby lowering the user score; and the user score and purchased non-monetary assets deteriorate at a predetermined rate while the user is offline.

9. A system according to claim 8, wherein said link is a public network.

10. A system according to claim 9, wherein said public network is the Internet.

11. A system according to claim 8, wherein said unit is a digital television receiver.

12. A system according to claim 8, wherein said unit is a personal computer.

13. A system according to claim 8 wherein said purchasing means comprises a computer program.

* * * * *